United States Patent [19]

Olson et al.

[11] Patent Number: 4,506,546

[45] Date of Patent: Mar. 26, 1985

[54] ADAPTER FOR CONVERTING LUMINOSITY SIGNALS INTO INDUCTIVE SIGNALS

[75] Inventors: Gene E. Olson; Christopher B. Stout; Donald D. Grover; Thomas P. Becker, all of Kenosha, Wis.

[73] Assignee: Snap-On Tools Corporation, Kenosha, Wis.

[21] Appl. No.: 501,718

[22] Filed: Jun. 6, 1983

[51] Int. Cl.³ .......... G01M 15/00

[52] U.S. Cl. .......... 73/119 A

[58] Field of Search .......... 73/116, 118, 117.3, 73/117.2, 119 A; 324/391, 392, 402

[56] References Cited

U.S. PATENT DOCUMENTS 4,373,384 2/1983 Olson et al. .......... 73/119 A 4,441,360 4/1984 Dooley et al. .......... 324/392 X

*Primary Examiner*—Jerry W. Myracle

*Attorney, Agent, or Firm*—Emrich & Dithmar

[57] ABSTRACT

The adapter includes a luminosity probe for replacing the glow plug associated with the selected cylinder in a diesel engine, a timer circuit responsive to inception of each electrical signal generated by the luminosity probe to produce a timer signal. The timer signal is differentiated to produce a spike. A pickup loop receives the spike and produces an inductive signal for application to the clip of a spark-ignited-engine timing meter.

3 Claims, 4 Drawing Figures

TIMER
B+

ADAPTER FOR CONVERTING LUMINOSITY SIGNALS INTO INDUCTIVE SIGNALS

BACKGROUND OF THE INVENTION

In analyzing the timing of an internal combustion engine, determination is made of the timing angle or number of degrees between the time a piston in a selected cylinder reaches its top-dead-center position and the time that combustion takes place in that cylinder. Automobile manufacturers commonly specify the number of degrees at a specific engine speed as a compromise to numerous considerations which must be taken into account. Speed of the engine can be determined by knowing the frequency of top-dead-center events.

The occurrence of top dead center is identified in the following manner. An internal combustion engine includes a wheel mounted on the end of the engine crankshaft so as to rotate therewith. A notch or other marking means is located in the periphery of the wheel. A receptacle for a magnetic probe is attached to the engine block and is so located that the marking means on the rotating wheel will pass the receptacle a known number of degrees of crankshaft rotation after the number one (or other selected) cylinder has reached its top-dead-center position.

Pat. No. 4,373,384, assigned to the assignee of this application, describes a timing/tach meter for diesel engines. Such meter senses the combustion event by light occurring during combustion. The glow plug for the prechamber associated with the selected cylinder is removed, and a luminosity probe forming part of the timing meter is inserted in its place. The luminosity probe includes a sensor which responds to light produced during combustion and generates a luminosity signal. In the patent, circuitry compares the instant of occurrence of a magnetic event with the instant of occurrence of a luminosity event to calculate the timing angle. This meter is not used, as such, to time a spark-ignited engine. A different timing meter which includes structure to identify top-dead-center events, or stroboscopic timing light is required for that purpose. But, the combustion event in a spark-ignited engine is sensed not by the occurrence of light, but rather by pulses of electric current flowing through the distributor conductor to a spark plug during combustion. Engine speed can be determined by the frequency of such pulses.

In other words, it has been heretofore necessary to employ two timing and/or speed measuring devices, one for analyzing the timing and/or speed in a diesel engine and another for analyzing the timing and/or speed in a spark-ignited engine.

SUMMARY OF THE INVENTION

It is therefore an important object of the invention to enable use of a single device to analyze the timing angle and speed in both a diesel engine and a spark-ignited engine.

Another object is to provide an adapter for converting luminosity signals into inductive signals for use with inductive pickup instruments.

Another object is to provide an adapter to enable a spark-ignited-engine timing/tach device to be used to analyze the timing and speed of a diesel engine.

In summary, there is provided an adapter for converting luminosity signals generated during combustion in an internal combustion engine into inductive signals, the engine including an engine block and a plurality of cylinders therein and a plurality of openings communicating therewith, the adapter comprising a body member adapted to be mounted in a selected opening of the engine and being exposed to light in the associated cylinder during combustion therein, photodetector means in the body member for converting luminosity signals during combustion in the cylinder to electrical signals, a timer circuit responsive to the inception of each electrical signal to produce a timer signal persisting for a predetermined duration, means for differentiating each timer signal to produce a spike at the commencement thereof, and a pickup loop coupled to the differentiating means for producing an inductive signal in response to each spike, the pickup loop being constructed to enable application thereto of the pickup means of the spark-ignited-engine timing meter.

The invention consists of certain novel features and a combination of parts hereinafter fully described, illustrated in the accompanying drawings, and particularly pointed out in the appended claims, it being understood that various changes in the details may be made without departing from the spirit, or sacrificing any of the advantages of the present invention.

BRIEF DESCRIPTION OF THE DRAWINGS

For the purpose of facilitating an understanding of the invention, there is illustrated in the accompanying drawings a preferred embodiment thereof, from an inspection of which, when considered in connection with the following description, the invention, its construction and operation, and many of its advantages should be readily understood and appreciated.

DETAILED DESCRIPTION OF THE PREFERRED EMBODIMENT

Figure 1:
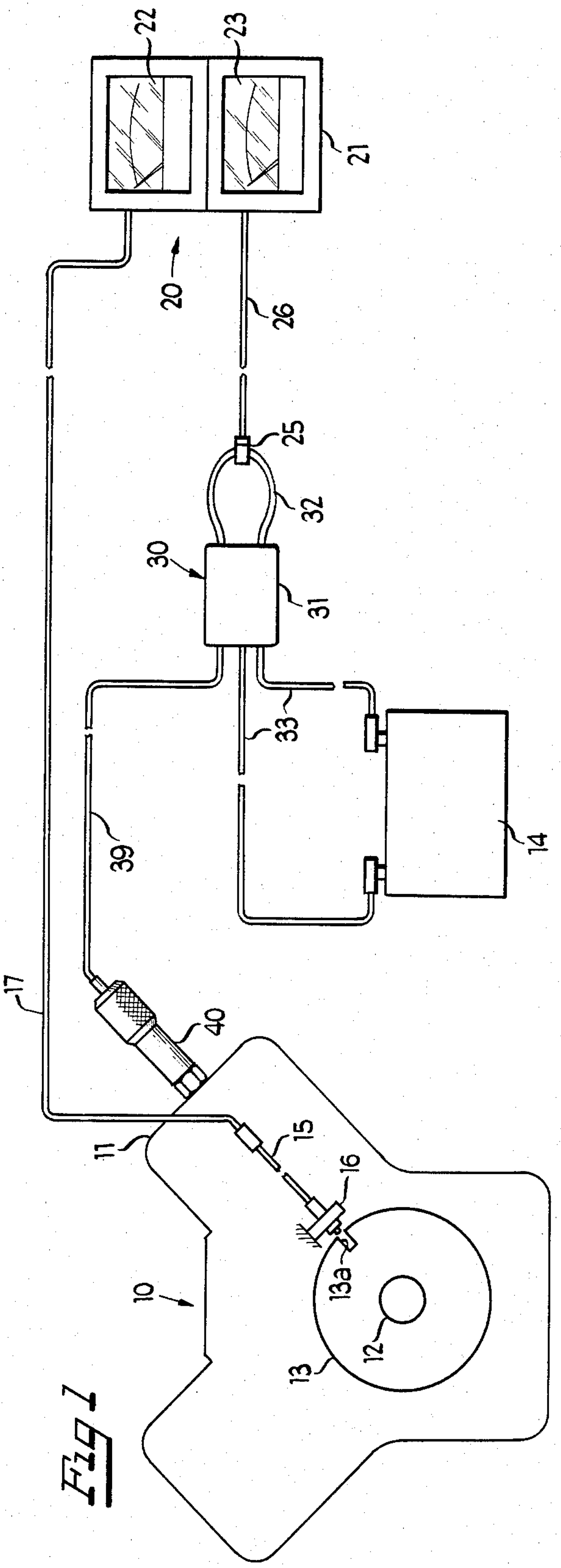
FIG. 1 schematically depicts the engine block of a diesel engine, a spark-ignited-engine timing meter and an adapter interconnected therebetween and incorporating the features of the present invention.

Turning now to the drawings and more particularly to FIG. 1 thereof, there is depicted a diesel engine 10 having a plurality of cylinders, one of which is labeled with the reference numeral 11. Each cylinder in the engine has an associated prechamber which in turn has a threaded opening to accommodate a glow plug. The glow plug for a selected cylinder is removed for the purpose of using a timing meter and is replaced by a luminosity probe 40 to be described in further detail hereinafter. Crankshaft 12 of the engine 10, or a shaft driven by the crankshaft, carries a rotating engine part 13, such as a harmonic balancer, the latter having a peripheral notch 13*a* or other marking means such as a projection or embedded magnet. The vehicle in which the engine 10 is mounted has the usual battery 14.

A sensing device 15, which usually is a magnetic probe, is detachably mounted in a fixed receptacle 16 such that the probe 15 is in effective relation with the notch 13*a*. The receptacle 16 is so located with respect to the engine block that the notch 13*a* passes the probe 15 a known number of degrees of crankshaft rotation after the piston in the number one cylinder has reached its top-dead-center position. The probe 15 generates a magnetic signal each time the notch 13*a* passes, this series of magnetic signals being applied by way of a conductor 17 to a timing meter 20. The meter 20 includes a housing 21 which carries a display 22 for displaying speed of the engine in rpm. A second display 23 in the housing 21 displays the timing angle in degrees. Not only does the timing meter 20 have a magnetic probe 15, but it also has a clip 25 connected by means of a conductor 26.

The timing meter 20 is adapted to time and analyze a spark-ignited engine. Such an engine has a plurality of spark plugs connected by conductors to a distributor. In timing such an engine, the clip 25 is applied to the conductor associated with the cylinder under test. Each time the spark plug fires, current is generated in such conductor and an electrical signal is induced into the clip 25. The magnetic probe 15 is inserted into a receptacle like the receptacle 16. Magnetic signals representative of top-dead-center events are generated in the same way described above with respect to the diesel engine 10. The timing meter 20 displays the timing angle on the display 23 representing the number of degrees between each top-dead-center event and each inductive signal. The displays 22 and 23 may alternately consist of digital readouts.

The present invention enables use of the spark-ignited-engine timing meter 20 to analyze the timing of a diesel engine 10.

To that end, there is provided an adapter 30 which includes a housing 31, a pickup loop 32 electrically and mechanically coupled thereto, and a pair of conductors 33 for connection to the vehicle battery 14. The adapter 30 also includes a luminosity probe 40 connected to the housing 31 by means of a conductor 39. To check the timing angle, a glow plug for the selected cylinder in the engine 10 is removed and replaced by the luminosity probe 40. The conductors 33 are attached to the battery 14 and the clip 25 of the timing meter 20 is applied to the loop 32. The luminosity probe 40 converts light or luminosity signals occurring during the combustion event to electrical signals which are converted by circuitry in the housing 31 into inductive signals in the loop 32. The inductive signals are coupled via the clip 25 to the timing meter 20.

Figure 4:
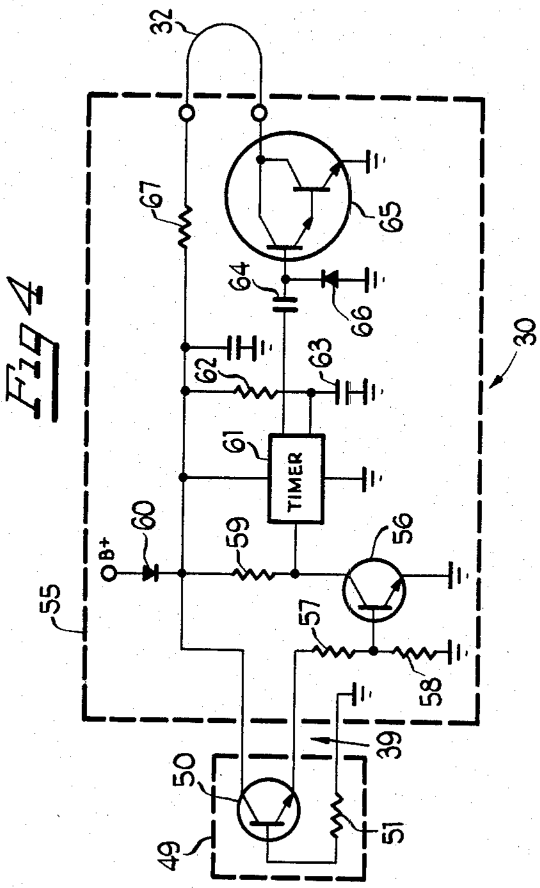
FIG. 4 is a circuit diagram of the adapter.
Figure 2:
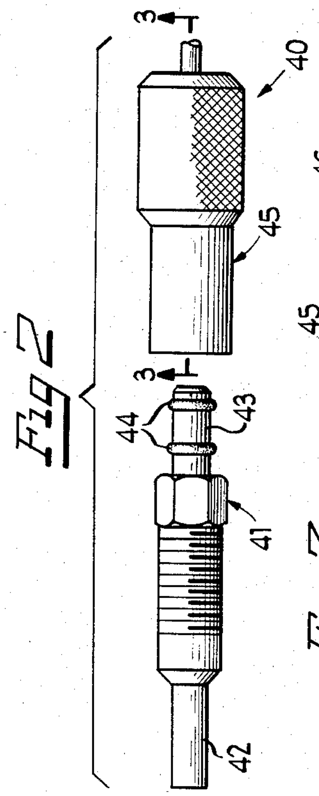
FIG. 2 is a view on an enlarged scale of the luminosity probe separated into its tubular body member and its tubular detector housing.
Figure 3:
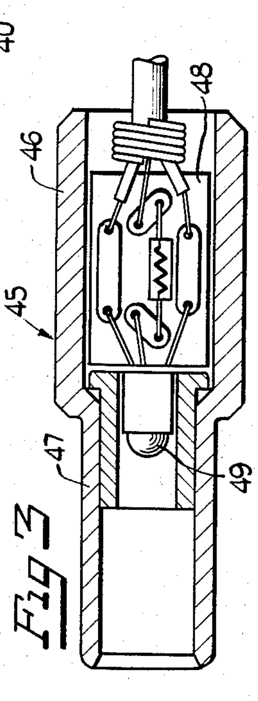
FIG. 3 is an enlarged sectional view taken along the line 3—3 of FIG. 2.

Referring to FIG. 2, certain details of the probe will be described. Further details may be obtained from copending application Ser. No. 285,942 owned by the assignee of this application. The probe 40 has a body portion 41 which is threadable into the glow plug opening. The body has a forwardly directed tip 42 which projects into the selected cylinder, and also has a rearwardly directed portion 43 which carries two O-rings 44. The probe 40 has a coupler 45 which telescopically and frictionally receives the portion 43. Further details of the coupler 45 are depicted in FIG. 3. The coupler 45 includes a tubular housing 46 and a reduced-diameter tubular element 47. Within the housing 46 is a printed circuit board 48 carrying electrical components such as resistors, etc. A photodetector 49 is mounted in the housing 46 and protrudes slightly into the tubular element 47. The photodetector 49 includes means for converting optical energy applied thereto to electrical signals on the conductor 39. As depicted in FIG. 4, the photodetector 49 includes an NPN phototransistor 50 and a base resistor 51.

The adapter 30 also includes a processing circuit or converter 55 which in turn includes an NPN transistor

56 having its emitter connected to ground and its base connected to a voltage divider defined by resistors 57 and 58 connected in series between the emitter of the phototransistor 50 and ground. The collector of the transistor 56 is connected to a load resistor 59. A diode 60 from the B+ supply voltage 60 prevents damage if the battery is connected with the wrong polarity. The collector of the transistor 56 is also connected to a timer 61 which produces a blanking pulse of predetermined duration upon the inception of a signal on the collector of the transistor 56. The duration of the blanking pulse is determined by the values of a resistor 62 and a capacitor 63 connected in series between the isolated B+ point and ground. The output of the timer 61 is connected through a differentiating capacitor 64 to a Darlington pair 65. A diode 66 connected between the base of the Darlington pair 65 and ground provides protection therefor. The loop 32 is connected between the output of the Darlington pair 65 and through a resistor 67 back to the isolated B+ point.

In operation, light or luminosity signals generated during a combustion event are applied to the phototransistor 50 causing the voltage on the emitter thereof to rise and the transistor 56 to conduct. The drop in voltage causes the timer 61 to produce a blanking pulse having a predetermined duration. Such blanking pulse is differentiated by the capacitor 64 which in turn creates a spike to cause conduction of the Darlington pair 65. A pulse of current is applied to the loop 32 which in turn produces an inductive pulse in the clip 25 as previously described.

The duration of the timer signal is set to occupy a substantial portion of the time between successive combustion events at the highest engine speed which is to be analyzed. For example, if it was intended to analyze the speed at 6,000 rpm then the duration of the blanking pulse should be say 15 ms. or less (the period of 6,000 rpm is 16.7 ms.). If the highest engine speed to be analyzed is 3,000 rpm, then the duration of the blanking pulse could be as much as 30 ms. The time between successive pulses would be 33.3 ms. The idea is to maximize the duration of the blanking pulse so that extraneous signals which may be generated by the probe 40 have no effect on the Darlington pair 65. It is only on the inception of each timer signal 61 that a spike is created to create an inductive pulse.

In the embodiment described above, the adapter 30 enables use of a spark-ignited-engine timing meter to analyze the timing and speed of a diesel engine. However, such adapter may be employed wherever it is necessary to convert luminosity signals into inductive signals. For example, a stroboscopic timing light with an inductive pickup can be used to time a diesel engine when the adapter 30 is connected. Also, any "secondary" tachometer which derives a signal from an inductive pickup can be used on a diesel engine when the adapter 30 is employed.

It should be understood that combustion luminosity is a feature common to internal combustion engines (gasoline, direct injected diesel or indirect injected diesel). The foregoing description specifically deals with a diesel engine. It is understood that the principles apply to all internal combustion engines.

We claim:

1. An adapter for converting luminosity signals generated during combustion in an engine into inductive signals, the engine including an engine block and a plurality of cylinders therein and a plurality of openings communicating therewith, said adapter comprising a body member adapted to be mounted in a selected opening of the engine and being exposed to light in the associated cylinder during combustion therein, photodetector means in said body member for converting luminosity signals during combustion in the cylinder to electrical signals, a timer circuit responsive to the inception of each electrical signal to produce a timer signal persisting for a predetermined duration, means for differentiating each timer signal to produce a spike at the commencement thereof, and a pickup loop coupled to said differentiating means for producing an inductive signal in response to each spike.

2. The adapter of claim 1, wherein said predetermined duration is about 12 ms.

3. An adapter enabling use of a spark-ignited-engine timing meter to time a diesel engine, the spark-ignited-engine timing meter being adapted to time a spark-ignited engine including a distributor, a plurality of spark plugs, and a plurality of distributor conductors coupling the distributor respectively to the spark plugs; tne spark-ignited engine timing meter including inductive pickup means adapted to be clipped onto a selected distributor conductor for producing inductive signals in response to pulses of electrical current generated as the associated spark plug fires, a magnetic probe for producing magnetic signals indicative of top-dead-center events, and a display for the amount of timing angle; the diesel engine including an engine block, a plurality of cylinders therein and a plurality of openings communicating therewith; said adapter comprising a body member adapted to be mounted in a selected opening of the diesel engine and being exposed to light in the associated cylinder during combustion therein, photodetector means in said body member for converting luminosity signals during combustion in the cylinder to electrical signals, a timer circuit responsive to the inception of each electrical signal to produce a timer signal persisting for a predetermined duration, means for differentiating each timer signal to produce a spike at the commencement thereof, and a pickup loop coupled to said differentiating means for producing an inductive signal in response to each spike, said pickup loop being constructed to enable application thereto of the pickup means of the spark-ignited-engine timing meter.

* * * * *

UNITED STATES PATENT AND TRADEMARK OFFICE

CERTIFICATE OF CORRECTION

PATENT NO. : 4,506,546

DATED : March 26, 1985

INVENTOR(S) : Gene E. Olson, et al.

It is certified that error appears in the above-identified patent and that said Letters Patent is hereby corrected as shown below:

Column 5, line 22, "tne" should be --the--.

Signed and Sealed this

*Sixteenth* Day of *July 1985*

[SEAL]

*Attest:*

DONALD J. QUIGG

*Attesting Officer* *Acting Commissioner of Patents and Trademarks*